United States Patent
Li et al.

(10) Patent No.: US 12,450,389 B2
(45) Date of Patent: Oct. 21, 2025

(54) SYNCHRONIZATION OF ACCESS CONTROL POLICIES WITH EXTERNAL DATA PLATFORMS

(71) Applicant: Databricks, Inc., San Francisco, CA (US)

(72) Inventors: Nong Li, San Francisco, CA (US); Itay Alfred Neeman, Seattle, WA (US)

(73) Assignee: Databricks, Inc., San Francisco, CA (US)

( * ) Notice: Subject to any disclaimer, the term of this patent is extended or adjusted under 35 U.S.C. 154(b) by 104 days.

(21) Appl. No.: 18/417,396

(22) Filed: Jan. 19, 2024

(65) Prior Publication Data

US 2025/0238545 A1 Jul. 24, 2025

(51) Int. Cl.
  G06F 21/62 (2013.01)
(52) U.S. Cl.
  CPC .................. *G06F 21/6245* (2013.01)
(58) Field of Classification Search
  CPC ................................................ G06F 21/6245
  See application file for complete search history.

(56) References Cited

U.S. PATENT DOCUMENTS

| | | | |
|---|---|---|---|
| 12,229,302 B1* | 2/2025 | Panwar | H04L 9/3239 |
| 2018/0295036 A1* | 10/2018 | Krishnamurthy | H04L 41/122 |
| 2023/0006889 A1* | 1/2023 | Thyagaturu | H04L 41/5054 |
| 2024/0340179 A1* | 10/2024 | De La Rosa | H04L 9/3239 |

\* cited by examiner

*Primary Examiner* — Azizul Choudhury
(74) *Attorney, Agent, or Firm* — Fenwick & West LLP (57) ABSTRACT

A system manages access control policies for accessing data stored in a plurality of data platforms. The system receives access control policy specification describing an access control policy that controls access to a set of datasets by a set of users. The set of datasets is defined based on a condition based on the data tags representing attributes of the datasets. The system compiles the access control policy specification to generate a platform independent access control representation of the access control policy. The platform independent access control representation comprises a set of tuples. Each tuple identifies a particular set of users, a particular set of datasets, and a particular action. The system further generates data platform specific instructions for each data platform of the plurality of data platforms.

20 Claims, 9 Drawing Sheets

SYNCHRONIZATION OF ACCESS CONTROL POLICIES WITH EXTERNAL DATA PLATFORMS

TECHNICAL FIELD

The disclosed configuration relates generally to access control in database systems, and more particularly to synchronization of access control policies across multiple data platforms.

BACKGROUND

Organizations, for example, large enterprises store data in various type of data platforms, for example, relational databases, document databases, file systems, and so on. There may be different data platforms of each type, for example, data platforms offered by different vendors that support different features and interfaces. An organization may have multiple relational databases each offered by a different vendor, for example, Oracle™, PostgreSQL™, Snowflake™, and so on. Users of an organization have access to data stored in these data platforms depending on various criteria, for example, their role within the organization, their location, and so on. Organizations implement access control policies to govern the access to data available to different users. For example, sensitive data may be masked if accessed by certain types of employees, certain data may not be accessible to employees outside a geographical region, and so on. Different data platforms support different access control mechanisms that require knowledge of specific languages or commands supported by the data platform. Furthermore, changes to the policy as well as changes in the data stored in the database and organizational changes require making updating the instructions used for implementing the access control policies across various data platforms. As a result, implementing access control policies in such organizations requires significant technical expertise and is a cumbersome and error prone process.

SUMMARY

A system manages access control policies for accessing data stored in a plurality of data platforms. Each data platform stores one or more datasets. A dataset may a database, a database table, a column of a database table, or a file. The system allows users to associate objects such as datasets or user accounts with tags. The system receives access control policy specification describing an access control policy that controls access to a set of datasets by a set of users. The set of datasets is defined using a condition based on the tags representing attributes of the datasets. For example, a tag may identify one or more columns as storing personally identifiable information (PII) and the access control policy may require data of datasets storing PII to be masked when accessed by a particular set of users.

The system compiles the access control policy specification to generate a platform independent access control representation of the access control policy. The platform independent access control representation comprises a set of tuples, each tuple identifying a particular set of users, a particular set of datasets, and a particular action. For example, the tuple may indicate that users of the particular set of datasets are allowed to perform the particular action on datasets of the particular set of datasets.

The system further generates data platform specific instructions for each data platform of the plurality of data platforms. The data platform specific instructions correspond to each tuple of the platform independent access control representation. The data platform specific instructions for a data platform use commands supported by the data platform for granting access to users of the particular set of users with respect to the particular action for each dataset of the particular set of datasets. According to an embodiment, the system executes the data platform specific instructions on the corresponding data platform to implement the access control policy according to the access control policy specification.

According to an embodiment, the access control policy specification may get modified. The system receives the modified access control policy specification and compiles the modified access control policy specification to generate a modified platform independent access control representation comprising a modified set of tuples. The system identifies one or more tuples that changed in the modified set of tuples compared to the set of tuples obtained from the original access control policy specification and regenerates instructions corresponding to the one or more tuples. As a result, the system minimizes the amount of processing performed to update the system in response to changes to the access control policy.

According to an embodiment, the system determines and stores a hash value for each tuple of the set of tuples of original platform independent access control representation. The system determines a hash value corresponding to each tuple of the set of tuples obtained from the modified access control policy specification. The system identifies the changed tuples by comparing a hash value of a tuple from the set of tuples of the original platform independent access control representation and a hash value of a corresponding tuple from the set of tuples of the modified platform independent access control representation.

According to an embodiment, the system periodically repeats the following steps to ensure that the access control policy is enforced in spite of changes in the system, for example, in spite of movements of users within the organization, changes in geographical location of users, changes to datasets, and so on. Accordingly, repeatedly the system compiles the access control policy specification to generate a modified platform independent access control representation comprising a modified set of tuples, identifies one or more tuples that changed in the modified set of tuples compared to the set of tuples obtained from the original access control policy specification, and regenerates instructions corresponding to each of the one or more tuples.

According to an embodiment, the steps described herein are executed as a process. According to an embodiment, a non-transitory computer readable storage medium comprising stored program code including instructions that when executed by one or more computer processors, cause the one or more computer processors to perform the steps of the methods described herein. Other embodiments include computer systems that include one or more processors and a non-transitory computer readable storage medium comprising stored program code including instructions that when executed by the one or more computer processors, cause the one or more computer processors to perform the steps of the methods described herein.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION

The figures depict various embodiments of the present configuration for purposes of illustration only. One skilled in the art will readily recognize from the following discussion that alternative embodiments of the structures and methods illustrated herein may be employed without departing from the principles of the configuration described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A data processing service allows users to store tags representing metadata describing various objects in the system including datasets and user accounts. The data processing system allows users to specify access control policies using a high level access control policy specification based on tags associated with datasets or users. An access control policy may specify that users that satisfy certain tag values have access to datasets that satisfy certain criteria based on tags associated with the dataset. For example, an access control policy may specify that users that belong to certain group within an organization may not be allowed to access datasets that are tagged as storing PII. Alternately, an access control policy may specify that data stored in datasets that are tagged as storing PII must be masked when accessed by users of a group within the organization.

The data processing system automatically synchronizes the access control policy as specified by the user across multiple data platforms. Conventional systems require users, for example, system administrators to manually implement the access control policies on different data platforms. Manual enforcement of access control policy across multiple data platforms is cumbersome and error prone since there may be differences in the implementations of the access control policy across different data platforms. The data processing service ensures that the access control policy is automatically and consistently implemented across multiple data platforms. Furthermore, the data processing service ensures that the access control policy continues to be enforced in spite of dynamic changes to user information or metadata of datasets that dynamically changes whether a user can access a particular dataset or not.

A tag represents an attribute of an object stored in a data platform. For example, a tag may indicate whether a dataset stores sensitive data. A tag is also referred to herein as a data tag. Examples of datasets include databases, tables, columns and so on for data platforms that represent databases. Examples of datasets include files for data platforms that represent file systems. The tags may be specified by users using a user interface provided by the data processing service. According to an embodiment, the data processing service automatically analyzes datasets and tags them. For example, the data processing service may analyze data of a certain column to determine that the column stores social security numbers and tag the column as storing PII (personally identifiable information).

The data processing service allows users to specify access control policies using conditions based on tags. Accordingly, the access control policies are based on criteria defined using attributes describing datasets or users. According to an embodiment, the access control policy specifies an action that can be performed by users of a set $S_u$ of users on datasets of a set $S_d$ of datasets. For example, the access control policy may allow users of set $S_u$ to perform one or more actions such as select, update, delete, or select with a mask applied to the data of records or data elements of datasets of set $S_d$ of datasets. The access control policy may restrict (or prevent) users of set $S_u$ from performing one or more actions such as select, update, delete, or select with a mask applied to the data of records or data elements of datasets of set $S_d$ of datasets. The set $S_d$ of datasets may be specified in the access control policy using a condition based on tags, for example, all datasets that have an attribute defined using as a tag having values within a particular set of value, or all datasets that have an attribute defined using as a tag having values within a range, or exceeding a threshold value, or below a threshold value. The access control policy may specify that data of the set $S_d$ of datasets should be transformed using a specified transform function for providing to users of set $S_u$ of users. For example, sensitive data may be masked using a masking function identified by the access control policy.

The data processing service 102 generates instructions for specific data platforms from the access control policy specification based on tags. The generated instructions can be executed on the corresponding data platform to implement the access control policy on the data platform. Furthermore, the data processing service 102 updates the instructions to ensure that the access control policy is enforced on each platform in spite of changes in the system, for example, changes to datasets or changes to users. For example, if an access control policy is based on a location of the user, the data processing service 102 ensures that the access control policy is enforced in spite of changes in user location. If an access control policy is based on a membership of the user in certain groups of an organization, the data processing service 102 ensures that the access control policy is enforced as users move from one group to another.

Figure 1:
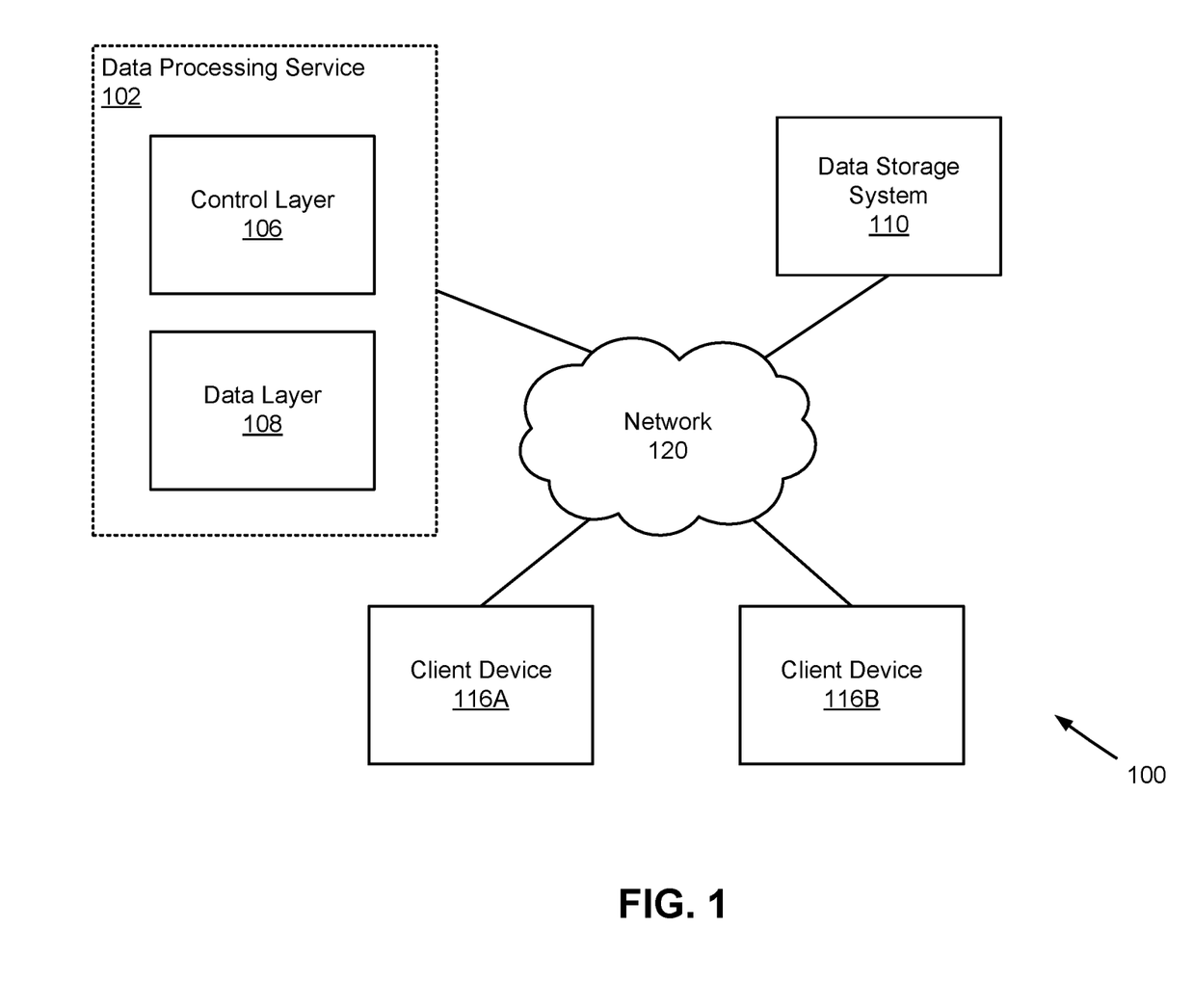
FIG. 1 is a high-level block diagram of a system environment for a data processing service, in accordance with an embodiment.

FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100. The computing systems of the system environment 100 may include some or all of the components (systems (or subsystems)) of a computer system 900 as described with FIG. 9.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system is described in relation to FIG. 4. In one instance, the clusters of computing resources are virtual machines or virtual data centers configured on a cloud infrastructure platform. In one instance, the control layer 106 is configured as a multi-tenant system and the data layers 108 of different tenants are isolated from each other. In one instance, a serverless implementation of the data layer 108 may be configured as a multi-tenant system with strong virtual machine (VM) level tenant isolation between the different tenants of the data processing service 102. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data management system 110 may be managed by the same entity that manages the data processing service 102.

The client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, client devices 116 of the system environment 100 may include some or all of the components (systems (or subsystems)) of a computer system 900 as described with FIG. 9.

In one embodiment, a client device 116 executes an application allowing a user of the client device 116 to interact with the various systems of the system environment 100 of FIG. 1. For example, a client device 116 can execute a browser application to enable interaction between the client device 116 and the data processing system 106 via the network 120. In another embodiment, the client device 116 interacts with the various systems of the system environment 100 through an application programming interface (API) running on a native operating system of the client device 116, such as IOS® or ANDROID™.

Figure 2:
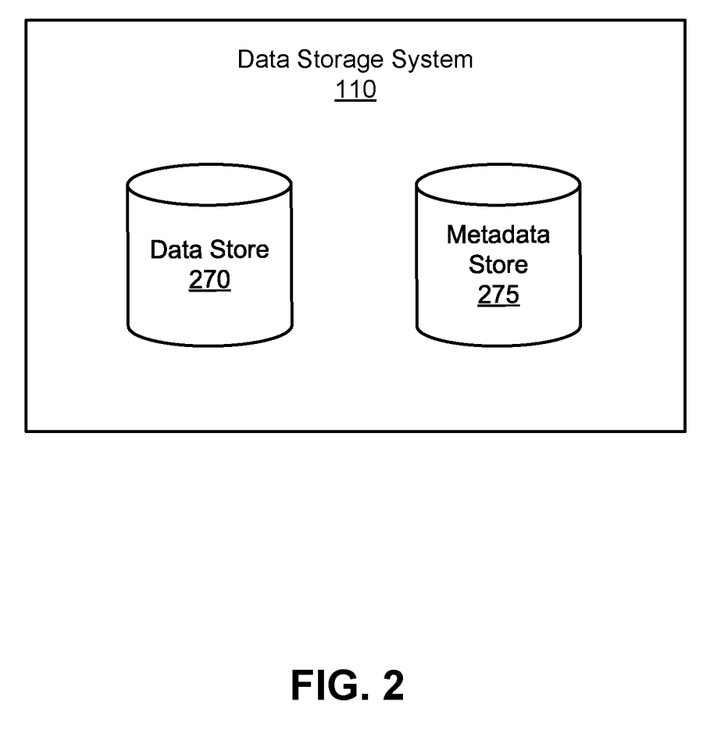
FIG. 2 illustrates a block diagram of an architecture of a data storage system, in accordance with an embodiment.

FIG. 2 is a block diagram of an architecture of a data storage system 108, in accordance with an embodiment. In one embodiment, the data storage system 108 includes a data ingestion module 250. The data storage system 108 also includes a data tables store 270 and a metadata store 275.

The data store 270 stores data associated with different tenants of the data processing service 102. In one embodiment, the data in data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

In one embodiment, a new version of the data table is committed when changes of a respective transaction are successfully applied to the data table of the data storage system 108. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that include another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity, and may indicate the specific changes to individual records with an indication of whether the record was inserted, deleted, or updated due to the corresponding transaction.

Figure 3:
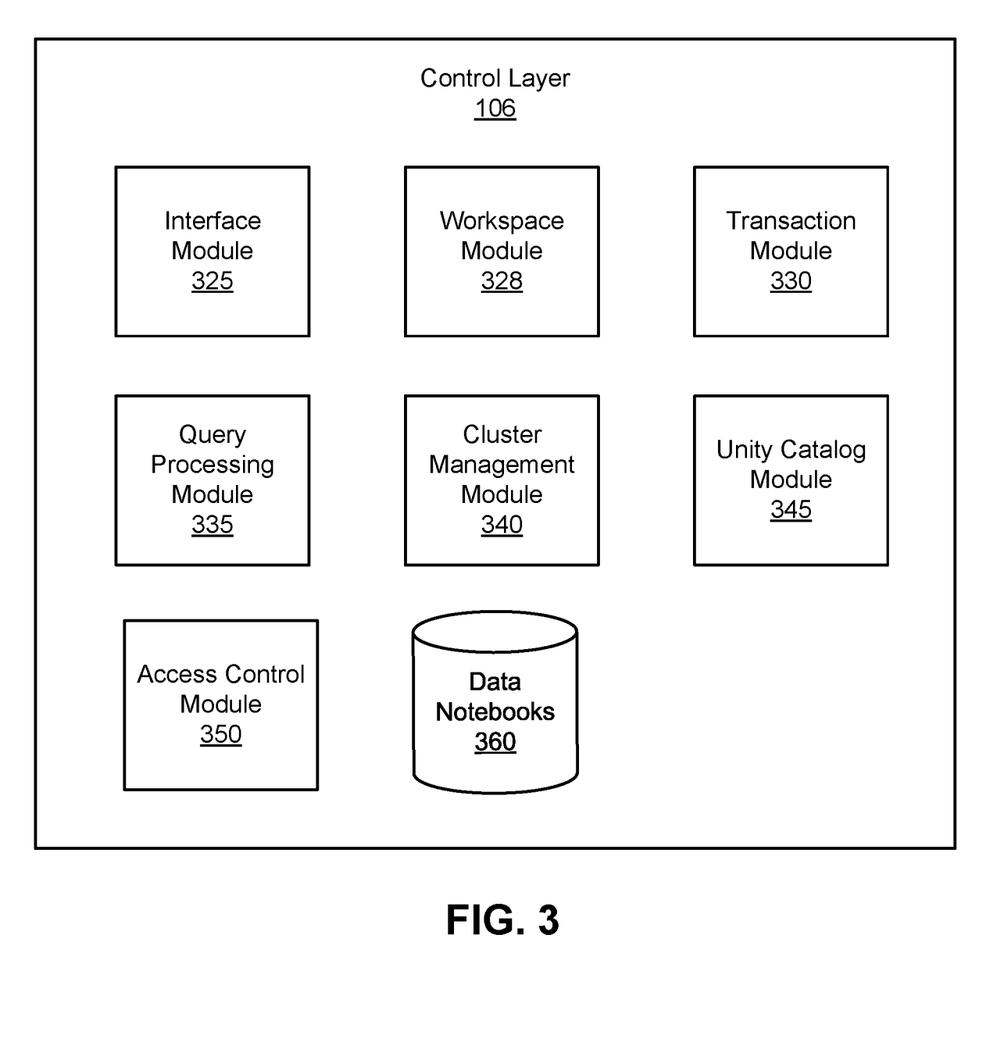
FIG. 3 illustrates a block diagram of an architecture of a control layer, in accordance with an embodiment.

FIG. 3 is a block diagram of an architecture of a control layer 106, in accordance with an embodiment. In one embodiment, the data processing system 106 includes an interface module 325, a transaction module 330, a query processing module 335, a cluster management module 340, and an access control module 350. The control layer 106 also includes a data notebook store 360. The modules 325, 330, 335, and 340 may be structured for execution by a computer system, e.g., 900 having some or all of the components as described in FIG. 9, such that the computer system 900 operates in a specified manner as per the described functionality.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the workspace module 325.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The workspace module 328 deploys workspaces within the data processing service 102. A workspace as defined herein may refer to a deployment in the cloud that functions as an environment for users of the workspace to access assets. An account of the data processing service 102 represents a single entity that can include multiple workspaces. In one embodiment, an account associated with the data processing service 102 may be associated with one workspace. In another embodiment, an account may be associated with multiple workspaces. A workspace organizes objects, such as notebooks, libraries, dashboards, and experiments into folders. A workspace also provides users access to data objects, such as tables or views or functions, and computational resources such as cluster computing systems.

In one embodiment, a user or a group of users may be assigned to work in a workspace. The users assigned to a workspace may have varying degrees of access permissions to assets of the workspace. For example, an administrator of the data processing service 102 may configure access permissions such that users assigned to a respective workspace are able to access all of the assets of the workspace. As another example, users associated with different subgroups may have different levels of access, for example users associated with a first subgroup may be granted access to all data objects while users associated with a second subgroup are granted access to only a select subset of data objects.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The query processing module 335 receives and processes queries that access data stored by the data storage system 110. The query processing module 335 may reside in the control layer 106. The queries processed by the query processing module 335 are referred to herein as database queries. The database queries are specified using a declarative database query language such as the SQL. The query processing module 335 compiles a database query specified using the declarative database query language to generate executable code that is executed. The query processing module 335 may encounter runtime errors during execution of a database query and returns information describing the runtime error including an origin of the runtime error representing a position of the runtime error in the database query. In one embodiment, the query processing module 335 provides one or more queries to appropriate clusters of the data layer 108, and receives responses to the queries from clusters in which the queries are executed.

The unity catalog module 345 is a fine-grained governance solution for managing assets within the data processing service 102. It helps simplify security and governance by providing a central place to administer and audit data access. In one embodiment, the unity catalog module 345 maintains a metastore for a respective account. A metastore is a top-level container of objects for the account. The metastore may store data objects and the permissions that govern access to the objects. A metastore for an account can be assigned to one or more workspaces associated with the account. In one embodiment, the unity catalog module 345 organizes data as a three-level namespace, a catalogue is the first layer, a schema (also called a database) is the second layer, and tables and views are the third layer.

In one embodiment, the unity catalog module 345 enables read and write of data to data stored in cloud storage of the data storage system 110 on behalf of users associated with an account and/or workspace. In one instance, the unity catalog module 345 manages storage credentials and external locations. A storage credential represents an authentication and authorization mechanism for accessing data stored on the data storage system 110. Each storage credential may be subject to access-control policies that control which users and groups can access the credential. An external location is an object that combines a cloud storage path (e.g., storage path in the data storage system 110) with a storage credential that authorizes access to the cloud storage path. Each storage location is subject to access-control policies that control which users and groups can access the storage credential. Therefore, if a user does not have access to a storage credential in the unity catalog module 345, the unity catalog module 345 does not attempt to authenticate to the data storage system 110.

In one embodiment, the unity catalog module 345 allows users to share assets of a workspace and/or account with users of other accounts and/or workspaces. For example, users of Company A can configure certain tables owned by Company A that are stored in the data storage system 110 to be shared with users of Company B. Each organization may be associated with separate accounts on the data processing service 102. Specifically, a provider entity can share access to one or more tables of the provider with one or more recipient entities.

Responsive to receiving a request from a provider to share one or more tables (or other data objects), the unity catalog module 345 creates a share in the metastore of the provider. A share is a securable object registered in the metastore for a provider. A share contains tables and notebook files from the provider metastore that the provider would like to share with a recipient. A recipient object is an object that associates an organization with a credential or secure sharing identifier allowing that organization to access one or more shares of the provider. In one embodiment, a provider can define multiple recipients for a given metastore. The unity catalog module 345 in turn may create a provider object in the metastore of the recipient that stores information on the provider and the tables that the provider has shared with the recipient. In this manner, a user associated with a provider entity can securely share tables of the provider entity that are stored in a dedicated cloud storage location in the data storage system 110 with users of a recipient entity by configuring shared access in the metastore.

Figure 6:
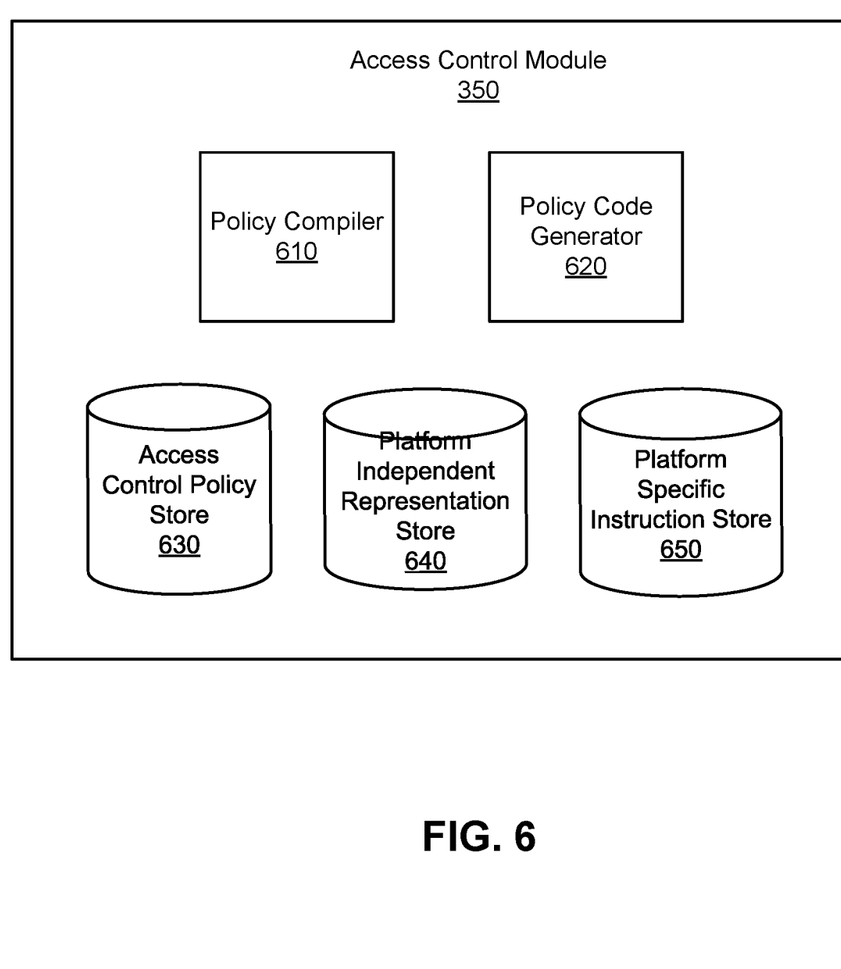
FIG. 6 shows the system architecture of the access control module, in accordance with an embodiment.

The access control module 350 receives access control policy specifications and automates and synchronizes the implementation of the access control policy specified in the access control policy specifications across multiple data platforms supported by the data processing service 102. The system architecture of the access control module 350 is illustrated in FIG. 6 and described in connection with FIG. 6. The access control module 350 processes the various data representations shown in FIG. 7. The access control module 350 executes the process illustrated in FIG. 8.

Figure 4:
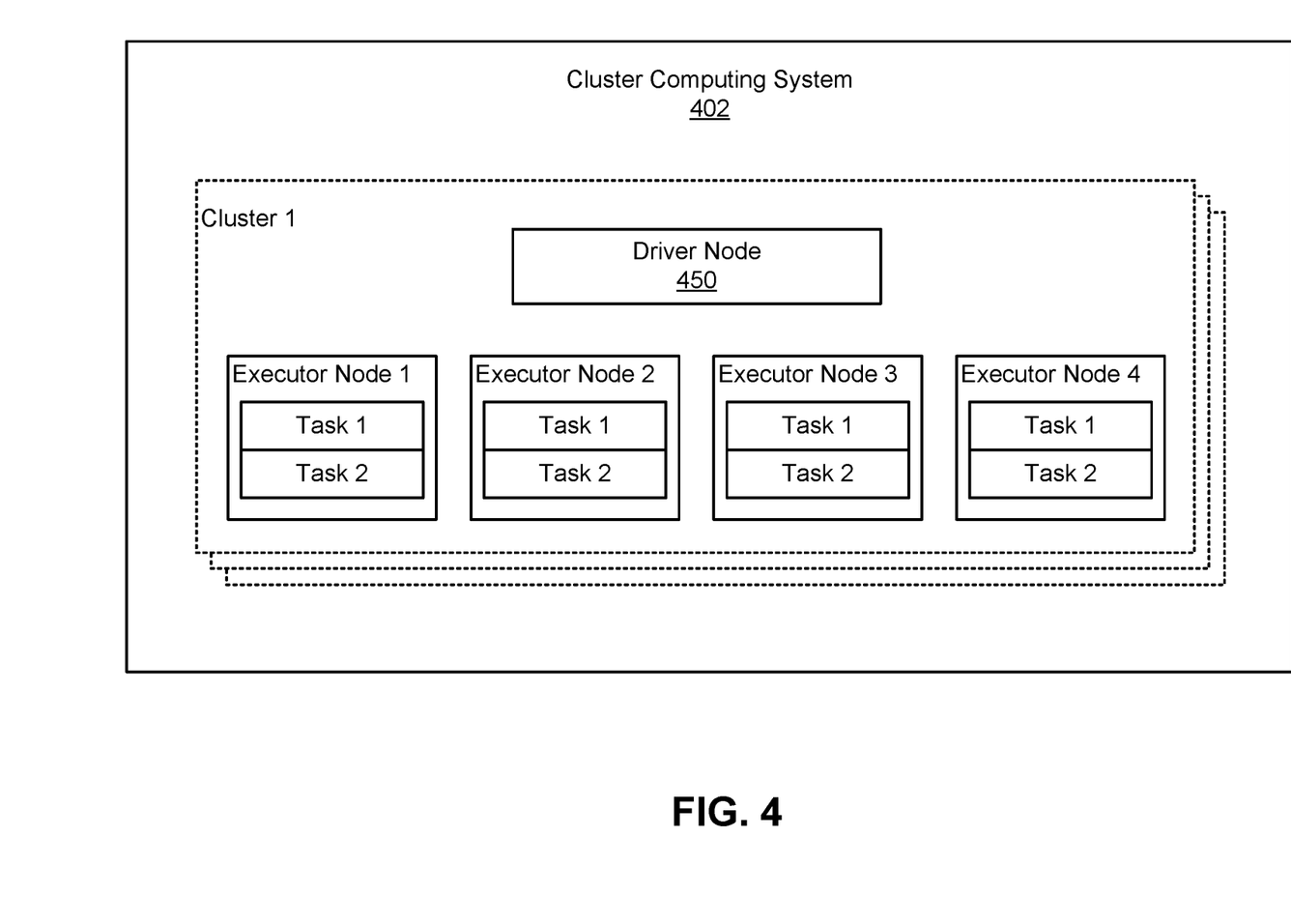
FIG. 4 illustrates a block diagram of an architecture of a cluster computing system of the data layer, in accordance with an embodiment.

FIG. 4 is a block diagram of an architecture of a cluster computing system 402 of the data layer 108, in accordance with an embodiment. In some embodiments, the cluster computing system 402 of the data layer 108 includes driver node 450 and worker pool including multiple executor nodes. The nodes may be structured for execution by a computer system, e.g., 900 having some or all of the components as described in FIG. 9, such that the computer system 900 operates in a specified manner as per the described functionality.

The driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries from the query processing module 335. The driver node 450 may compile a database query and generate an execution plan. The driver node 450 distributes the query information including the generated code to the executor nodes. The executor nodes execute the query based on the received information.

The worker pool can include any appropriate number of executor nodes (e.g., 4 executor nodes, 12 executor nodes, 256 executor nodes). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to the driver node 410. According to an embodiment, an executor node executes the generated code for the database query for a particular subset of data that is processed by the database query. The executor nodes execute the query based on the received information from the driver node 450.

Figure 5:
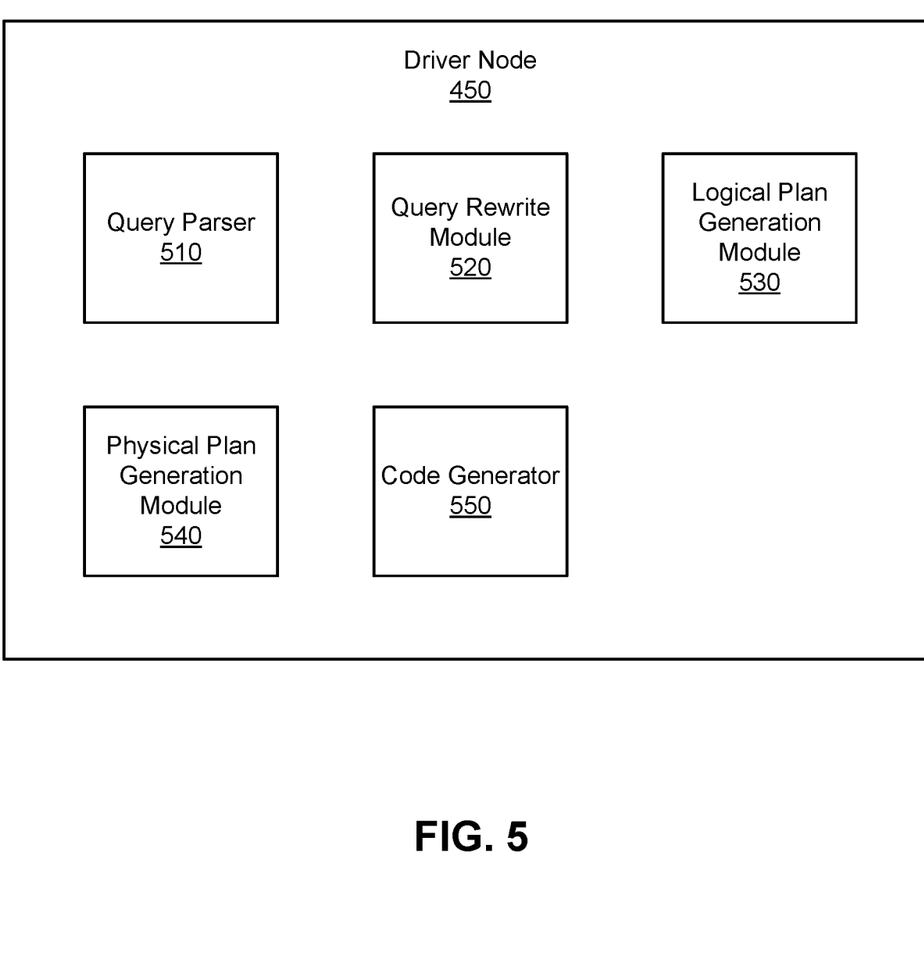
FIG. 5 is a block diagram of an architecture of a driver node, in accordance with an embodiment.

FIG. 5 is a block diagram of an architecture of a driver node 450, in accordance with an embodiment. In one instance, the driver node 450 includes a query parser 510, a query rewrite module 520, a logical plan generation module 530, and a physical plan generation module 540. The modules and nodes may be structured for execution by a computer system, e.g., 900 having some or all of the components as described in FIG. 9, such that the computer system 900 operates in a specified manner as per the described functionality.

The query parser 510 receives a database query for processing and parses the database query. The database query is specified using a declarative database query language such as SQL. The query parser 510 parses the database query to identify various tokens of the database query and build a data structure representation of the database query. The data structure representation identifies various components of the database query, for example, any SELECT expressions that are returned by the database query, tables that are input to the query, a conditional clause of the database query, a group by clause, and so on. According to an embodiment, the data structure representation of the database query is a graph model based on the database query.

The query rewrite module 520 performs transformations of the database query, for example, to improve the execution of the query. The improvement may be in terms of execution time, memory utilization, or other resource utilization. A database query may process one or more tables that store a significant number of records that are processed by the database query. Since the declarative database query language does not specify the procedure for determining the result of the database query, there are various possible procedures for executing the database query.

The query rewrite module 520 may transform the query to change the order of processing of certain steps, for example, by changing the order in which tables are joined, by changing the order in which certain operations such as filtering of records of a table is performed in relation to other operations. The query rewrite module 520 may transform the database query to cause certain temporary results to be materialized. The query rewrite module 520 may eliminate certain operations if the operations are determined to be redundant. The query rewrite module 520 may transform a database query so that certain computations such as subqueries or expressions are shared. The query rewrite module 520 may transform the database query to pushdown certain computations, for example, by changing the order in which certain predicates are applied to the computation as early as possible. The query rewrite module 520 may transform the database query to modify certain predicates to use more optimized versions of the predicates that are computationally equivalent but provide better performance.

The logical plan generation module 530 generates a logical plan for the database query. The logical plan includes representation of the various steps that need to be executed for processing the database query. According to an embodiment, the logical plan generation module 530 generates an unresolved logical plan based on the transformed query graph representation. Various relation names (or table names) and column names may not be resolved in an unresolved logical plan. The logical plan generation module 530 generates a resolved logical plan from the unresolved logical plan by resolving the relation names and column names in the unresolved logical plan. The logical plan generation module 530 further optimizes the resolved logical plan to obtain an optimized logical plan.

The physical plan generation module 540 generates a physical plan from the logical plan generated by the logical plan generation module 530. The physical plan specifies details of how the logical plan is executed by the data processing service 102. The physical plan generation module 540 may generate different physical plans for the same logical plan and evaluate each physical plan using a cost model to select the optimal physical plan for execution. The physical plan further specifies details of various operations of the logical plan. As an example, if the logical plan includes a join operator, the physical plan may specify the type of join that should be performed for implementing the join operator. For example, the physical plan may specify whether the join operator should be implemented as a hash join, merge join, or sort join, and so on. The physical plan may be specific to a database system, whereas the logical plan may be independent of database systems and may be executed on any target database system by converting to a physical plan for that target database system.

The code generator 550 generates code representing executable instructions for implementing the physical plan for executing a database query. The generated code includes a set of instructions for each operator specified in the execution plan. The generated code is specified using a programming language that may be compiled and executed.

System Architecture of Access Control Module

FIG. 6 shows the system architecture of the access control module, in accordance with an embodiment. The access control module 350 includes a policy compiler 610, a policy code generator 620, an access control policy store 630, a platform independent representation store 640, and a platform specific instruction store 650. Other embodiments may include more or fewer modules than those indicated in FIG. 6. Furthermore, the modules shown in FIG. 6 may be part of other modules or systems. For example, one or more stores 630, 640, 650 may be included in the data storage system 110.

Figure 7:
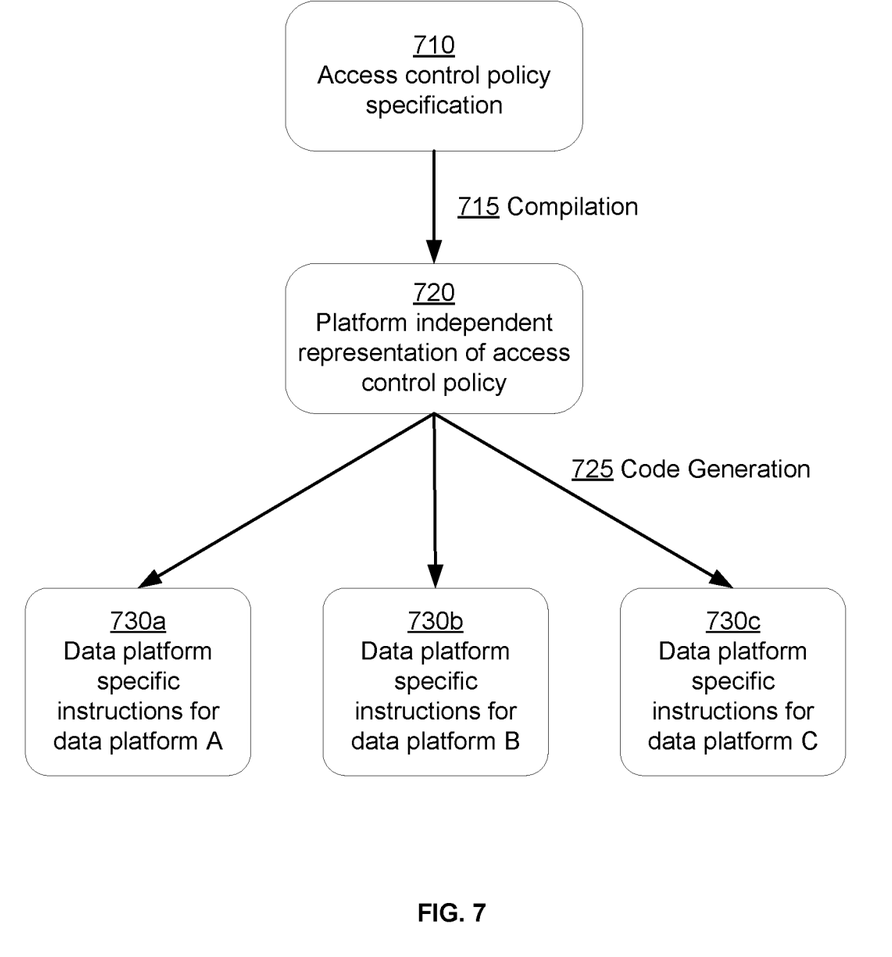
FIG. 7 illustrates the various type of data representations generated by the access control module, in accordance with an embodiment.

FIG. 7 illustrates the various type of data representations generated by the access control module, in accordance with an embodiment. The different types of data representations shown in FIG. 7 are described in connection with the modules of the access control module 350 as shown in FIG. 6. The access control module 350 receives an access control policy specification 710 that is stored in the access control policy store 630. The policy compiler 610 compiles the access control policy specification 710 to generate a platform independent representation of the access control policy 720. The platform independent representation of the access control policy 720 is stored in the platform independent representation store 640. The policy code generator 620 compiles the platform independent representation of the access control policy 720 to generate data platform specific instructions 730*a*, 730*b*, 730*c* for various platforms A, B, C respectively. The data platform specific instructions 730*a*, 730*b*, 730*c* are stored in the platform specific instruction store 650. Each data platform stores one or more datasets.

According to an embodiment, the data processing service 102 accesses a heterogeneous set of data platforms that may include different types of data stores, for example, relational databases, document databases, file system based data stores and so on. The access control module generates instructions for each type of data platform to implement the same access control policy on each of the data platforms. The instructions generated are platform specific. For example, for certain data platform the generated instructions may generate specific roles that represent different sets of users and grants access to specific datasets to each set of users. For another data platform the instructions generated may create a user defined function that controls access to data for different users.

Overall Process

Figure 8:
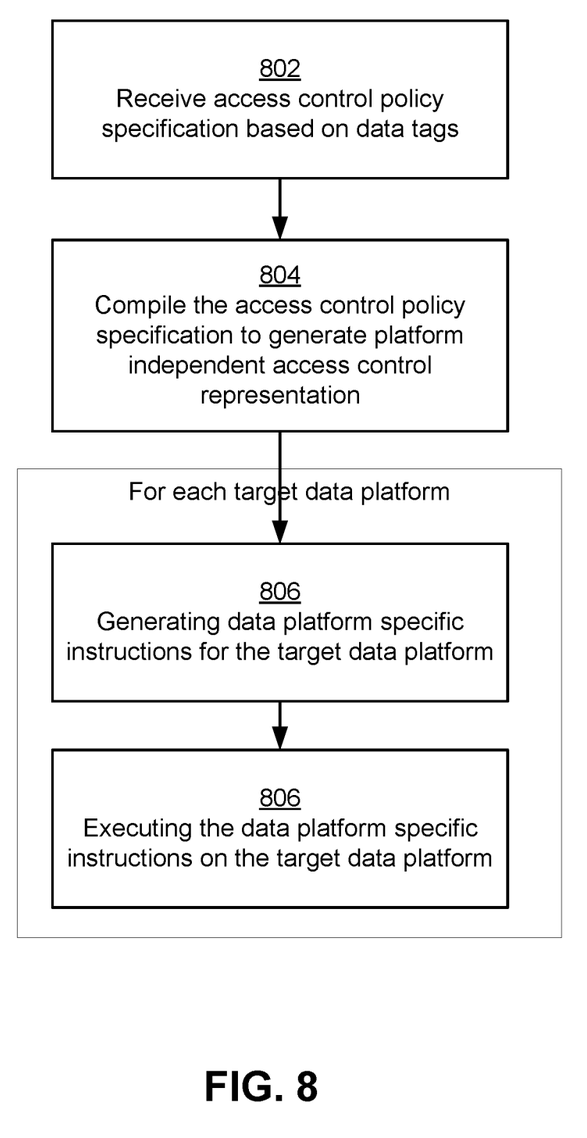
FIG. 8 is a flowchart of a method for synchronizing access control policies across multiple data platforms, in accordance with an embodiment.

FIG. 8 is a flowchart of a method for synchronizing access control policies across multiple data platforms, in accordance with an embodiment. The process shown in FIG. 8 may be performed by one or more components (e.g., the access control module 350 of the control layer 106) of a data processing system/service (e.g., the data processing service 102). Other entities may perform some or all of the steps in FIG. 8. The data processing service 102 as well as the other entities may include some or of the component of the machine (e.g., computer system) described in conjunction with FIG. 9. Embodiments may include different and/or additional steps, or perform the steps in different orders.

The access control module 350 receives an access control policy specification. The access control policy specification describes an access control policy for accessing a set of datasets by a set of users. According to an embodiment, the set of datasets is defined based on a condition based on the data tags representing attributes of the datasets. According to an embodiment, the set of users is defined based on a condition based on the data tags representing attributes of users or user accounts used by users of the data processing service 102. The data tags represent attributes of datasets or users.

The access control module 350 compiles the access control policy specification to generate a platform independent access control representation of the access control policy. The platform independent access control representation comprising a set of tuples. Each tuple <S, D, A> identifies a particular set of users S, a particular set of datasets D, and a particular action A. According to an embodiment, the set of users S enumerates each user belonging to the set S. Similarly, the set of datasets D enumerates all the datasets that belong to the set D. According to an embodiment, the tuple <S, D, A> indicates that users of set S are permitted to perform action A on datasets of set D. The access control module 350 generates the minimum number of tuples needed to enforce an access control policy. Accordingly, the access control module 350 does not generate all possible combinations of tuples. For example, the access control module 350 does not generate tuples for which either one of the datasets S or D is empty. Accordingly, the access control module 350 generates tuples if both of the datasets S or D have at least one element and are therefore not empty.

The access control module 350 generates data platform specific instructions for each data platform. The data platform specific instructions are generated for each tuple of the platform independent access control representation. The generated instructions use commands supported by the data platform for granting access to users of the particular set of users with respect to the particular action for each dataset of the particular set of datasets.

If an access control policy is based on a value of a tag of a dataset, the data processing service 102 ensures that the access control policy is enforced as tags of various datasets are modified or as datasets are structurally modified. For example, if an access control policy causes datasets having certain value V1 of a tag T1 to be masked when presented to users of a particular set S1, the data processing service 102 ensures that if any dataset is updated so that the tag T1 is changed from another value V2 to V1, the dataset is subsequently masked when presented to users of set S1. Similarly, if a dataset is updated so that that value of tag T1 is changed from V1 to a different value V2, the data of the dataset is no longer masked when presented to users of set S1. Furthermore, if there are changes made to the access control policy itself, the changes trigger the data processing service 102 to regenerate the instructions for various platforms so that the new access control policy is enforced. Furthermore, any changes to the tags of datasets or tags of users or changes to the policy cause the system to execute minimum set of instructions in each data platform. Accordingly, if a change to a policy of the tag values does not affect the access provided to a particular dataset or the access control for a set of users, the data processing service 102 does not execute any instructions for those datasets or set of users.

According to some embodiments, the access control module 350 determines whether there are any changes to the access control policy, for example, changes made by a user to the access control policy specification. If the access control module 350 detects that the access control policy specification was modified, the access control module 350 executes the process of generating the platform independent access control representation of the access control policy and using the platform independent access control representation to further generate data platform specific instructions for each data platform.

According to an embodiment, the access control module 350 generates a hash value for each tuple of the platform independent access control representation. The hash value may be generated by representing the tuple using a canonical representation so that two tuples that are equivalent generate the same hash value. If the access control module 350 regenerates the platform independent access control representation, the access control module 350 compares the hash values of the newly generated tuples with the hash values of corresponding tuples based on the previous version of the access control policy. If the hash value matches for the new tuple versus the previous version of the tuple, the access control module 350 does not generate new data platform specific instructions for each data platform. Instead, the access control module 350 reuses the previously generated data platform specific instructions for each data platform corresponding to the tuple. Furthermore, if the data platform specific instructions are not generated for a data platform, the access control module 350 does not re-execute the data platform specific instructions for that platform. The access control module 350 executes the data platform specific instructions for a data platform if a new set of data platform specific instructions was generated for that tuple.

According to an embodiment, the access control module 350 generates hash values for each set of data platform specific instructions corresponding a tuple. If the hash value of the new set of data platform specific instructions matches the hash value of the corresponding set of data platform specific instructions that were previously generated, the access control module 350 does not execute the new set of data platform specific instructions. If the hash value of the new set of data platform specific instructions does not match the hash value of the corresponding set of data platform specific instructions that were previously generated, the access control module 350 executes the new set of data platform specific instructions to enforce the revised access control policy.

According to an embodiment, the access control module 350 periodically executes the process shown in FIG. 8 to ensure that new platform independent access control representation and new set of data platform specific instructions are generated if there are changes in either user information or dataset metadata. The access control module 350 may repeat execution of the process based on a predefined schedule, for example, on an hourly basis or every few minutes, depending on how sensitive the data is or depending on the policies of the organization. For example, if there were changes in user information due to users moving within the organization or user moving from one location to another, and so on, the access control module 350 ensures that new tuples are generated and data platform specific instructions are generated and executed to ensure that the access control policy continues to be enforced in spite of dynamic changes to the user information. Similarly, if the dataset metadata changes causing modifications to the tag values describing the datasets, the access control module 350 periodically executes the process shown in FIG. 8 to ensure that new platform independent access control representation and new set of data platform specific instructions are generated and executed to ensure that the access control policy continues to be enforced in spite of dynamic changes to the metadata of datasets or user information.

Computer Architecture

Figure 9:
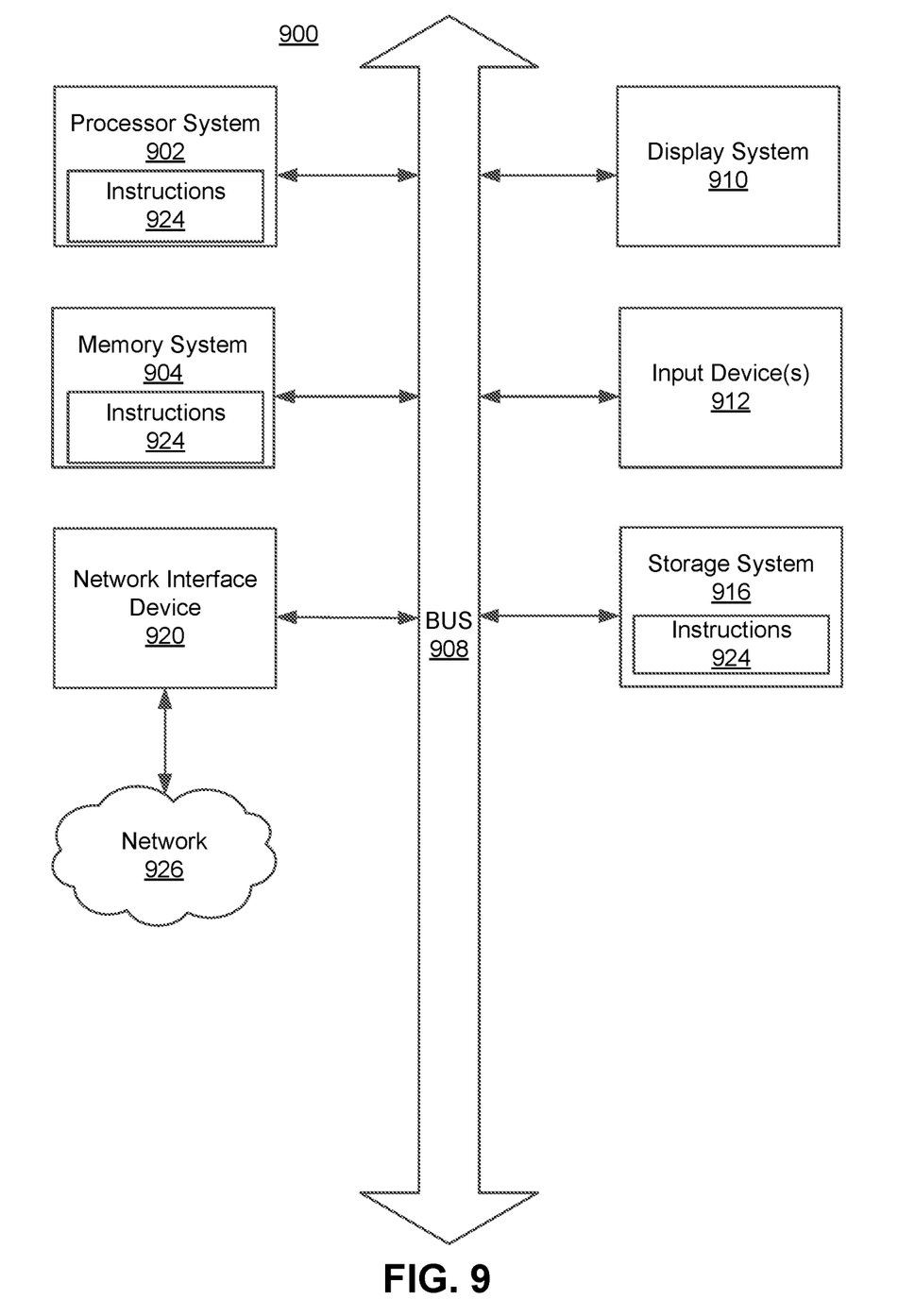
FIG. 9 illustrates an example machine to read and execute computer readable instructions, in accordance with an embodiment.

Turning now to FIG. 9, illustrated is an example machine to read and execute computer readable instructions, in accordance with an embodiment. Specifically, FIG. 9 shows a diagrammatic representation of the data processing service 102 (and/or data processing system) in the example form of a computer system 900. The computer system 900 is structured and configured to operate through one or more other systems (or subsystems) as described herein. The computer system 900 can be used to execute instructions 924 (e.g., program code or software) for causing the machine (or some or all of the components thereof) to perform any one or more of the methodologies (or processes) described herein. In executing the instructions, the computer system 900 operates in a specific manner as per the functionality described. The computer system 900 may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The computer system 900 may be a server computer, a client computer, a personal computer (PC), a tablet PC, a smartphone, an internet of things (IoT) appliance, a network router, switch or bridge, or other machine capable of executing instructions 924 (sequential or otherwise) that enable actions as set forth by the instructions 924. Further, while only a single machine is illustrated, the term "machine" shall also be taken to include any collection of machines that individually or jointly execute instructions 924 to perform any one or more of the methodologies discussed herein.

The example computer system 700 includes a processing system 902. The processor system 902 includes one or more processors. The processor system 902 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor system 902 executes an operating system for the computing system 900. The computer system 900 also includes a memory system 904. The memory system 904 may include or more memories (e.g., dynamic random access memory (RAM), static RAM, cache memory). The computer system 900 may include a storage system 916 that includes one or more machine readable storage devices (e.g., magnetic disk drive, optical disk drive, solid state memory disk drive).

The storage unit 716 stores instructions 724 (e.g., software) embodying any one or more of the methodologies or functions described herein. For example, the instructions 724 may include instructions for implementing the functionalities of the transaction module 330 and/or the file management module 335. The instructions 924 may also reside, completely or at least partially, within the memory system 904 or within the processing system 902 (e.g., within a processor cache memory) during execution thereof by the computer system 700, the main memory 904 and the processor system 902 also constituting machine-readable media. The instructions 924 may be transmitted or received over a network 926, such as the network 926, via the network interface device 920.

The storage system 916 should be taken to include a single medium or multiple media (e.g., a centralized or distributed database, or associated caches and servers communicatively coupled through the network interface system 920) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

In addition, the computer system 900 can include a display system 910. The display system 910 may driver firmware (or code) to enable rendering on one or more visual devices, e.g., drive a plasma display panel (PDP), a liquid crystal display (LCD), or a projector. The computer system 900 also may include one or more input/output systems 912. The input/output (IO) systems 912 may include input devices (e.g., a keyboard, mouse (or trackpad), a pen (or stylus), microphone) or output devices (e.g., a speaker). The computer system 900 also may include a network interface system 920. The network interface system 920 may include one or more network devices that are configured to communicate with an external network 926. The external network 926 may be a wired (e.g., ethernet) or wireless (e.g., WiFi, BLUETOOTH, near field communication (NFC).

The processor system 902, the memory system 904, the storage system 916, the display system 910, the IO systems 912, and the network interface system 920 are communicatively coupled via a computing bus 908.

Additional Considerations

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A method comprising:
   storing data tags representing attributes of datasets stored in a plurality of data platforms;
   receiving an original access control policy specification describing an access control policy for accessing sets of datasets by sets of users, wherein a set of datasets is defined based on a condition based on the data tags representing attributes of the datasets;
   compiling the original access control policy specification to generate a platform independent access control representation comprising a first set of tuples, each tuple identifying a particular set of users, a particular set of datasets, and a particular action;
   for each data platform of the plurality of data platforms, generating data platform specific instructions corresponding to each tuple of the first set of tuples for granting access to users of the particular set of users with respect to the particular action for each dataset of the particular set of datasets corresponding to the tuple;
   receiving a modified access control policy specification obtained by modifying the original access control policy specification;
   compiling the modified access control policy specification to generate a second set of tuples;
   determining a hash value for each of the first and second set of tuples; and
   identifying one or more tuples that changed in the second set of tuples compared to the first set of tuples by comparing a hash value of a tuple from the first set of tuples and a hash value of a corresponding tuple from the second set of tuples and
   regenerating instructions for the one or more tuples.

2. The method of claim 1, further comprising, for each of a plurality of data platforms:
   executing the data platform specific instructions on the data platform to implement the access control policy according to an access control policy specification.

3. The method of claim 1, further comprising:
   storing data tags describing users, wherein an access control policy defines a set of users based on the data tags describing users.

4. The method of claim 1, further comprising:
   periodically repeating steps comprising:
   compiling a modified access control policy specification to generate a modified platform independent access control representation comprising a modified set of tuples;
   identifying one or more tuples that changed in the modified set of tuples compared to a previous set of tuples obtained from a previous access control policy specification; and
   regenerating instructions corresponding to each of the one or more tuples.

5. The method of claim 1, wherein a data tag specifies whether a particular dataset stores personally identifiable information.

6. The method of claim 1, wherein the plurality of data platforms comprises one or more data platforms that process commands specified using structured query language.

7. The method of claim 1, wherein the plurality of data platforms comprises one or more relational databases and one or more data platforms that support file system based access.

8. The method of claim 1, wherein a dataset comprises at least one of a database, a database table, a column of a database table, or a file.

9. A non-transitory computer readable storage medium comprising stored program code, the stored program code comprising instructions, the instructions when executed by one or more computer processors, cause the one or more computer processors to:
   store data tags representing attributes of datasets stored in a plurality of data platforms;
   receive an original access control policy specification describing an access control policy for accessing sets of datasets by sets of users, wherein a set of datasets is defined based on a condition based on the data tags representing attributes of the datasets;
   compile the original access control policy specification to generate a platform independent access control representation comprising a first set of tuples, each tuple identifying a particular set of users, a particular set of datasets, and a particular action;
   for each data platform of the plurality of data platforms, generate data platform specific instructions corresponding to each tuple of the first set of tuples for granting access to users of the particular set of users with respect to the particular action for each dataset of the particular set of datasets corresponding to the tuple;

receive a modified access control policy specification obtained by modifying the original access control policy specification;

compile the modified access control policy specification to generate a second set of tuples;

determine a hash value for each of the first and second set of tuples; and identify one or more tuples that changed in the second set of tuples compared to the first set of tuples by comparing a hash value of a tuple from the first set of tuples and a hash value of a corresponding tuple from the second set of tuples; and regenerate instructions for the one or more tuples.

10. The non-transitory computer readable storage medium of claim 9, wherein the instructions further cause the one or more computer processors to:

for each of a plurality of data platforms:
execute the data platform specific instructions on the data platform to implement the access control policy according to an access control policy specification.

11. The non-transitory computer readable storage medium of claim 9, wherein the instructions further cause the one or more computer processors to:

store data tags describing users, wherein an access control policy defines a set of users based on the data tags describing users.

12. The non-transitory computer readable storage medium of claim 9, wherein the instructions further cause the one or more computer processors to periodically repeat steps:

compile a modified access control policy specification to generate a modified platform independent access control representation comprising a modified set of tuples;

identify one or more tuples that changed in the modified set of tuples compared to a previous set of tuples obtained from a previous original access control policy specification; and regenerate instructions corresponding to each of the one or more tuples.

13. The non-transitory computer readable storage medium of claim 9, wherein the plurality of data platforms comprises one or more data platforms that process commands specified using structured query language.

14. The non-transitory computer readable storage medium of claim 9, wherein the plurality of data platforms comprises one or more relational databases and one or more data platforms that support file system based access.

15. The non-transitory computer readable storage medium of claim 9, wherein a dataset comprises at least one of a database, a database table, a column of a database table, or a file.

16. A computer system comprising:
one or more computer processors; and
a non-transitory computer readable storage medium comprising stored program code, the stored program code comprising instructions, the instructions when executed cause the one or more computer processors to:

store data tags representing attributes of datasets stored in a plurality of data platforms;

receive an original access control policy specification describing an access control policy for accessing sets of datasets by sets of users, wherein a set of datasets is defined based on a condition based on the data tags representing attributes of the datasets;

compile the original access control policy specification to generate a platform independent access control representation comprising a first set of tuples, each tuple identifying a particular set of users, a particular set of datasets, and a particular action;

for each data platform of the plurality of data platforms, generate data platform specific instructions corresponding to each tuple of the first set of tuples for granting access to users of the particular set of users with respect to the particular action for each dataset of the particular set of datasets corresponding to the tuple;

receive a modified access control policy specification obtained by modifying the original access control policy specification;

compile the modified access control policy specification to generate a second set of tuples;

determine a hash value for each of the first and second set of tuples;

identify one or more tuples that changed in the second set of tuples compared to the first set of tuples by comparing a hash value of a tuple from the first set of tuples and a hash value of a corresponding tuple from the second set of tuples; and regenerate instructions for the one or more tuples.

17. The computer system of claim 16, wherein the instructions further cause the one or more computer processors to:

for each of a plurality of data platforms:
execute the data platform specific instructions on the data platform to implement the access control policy according to an access control policy specification.

18. The computer system of claim 16, wherein the instructions further cause the one or more computer processors to:

store data tags describing users, wherein an access control policy defines a set of users based on the data tags describing users.

19. The computer system of claim 16, wherein the plurality of data platforms comprises one or more data platforms that process commands specified using structured query language.

20. The computer system of claim 16, wherein the plurality of data platforms comprises one or more relational databases and one or more data platforms that support file system based access.

* * * * *